US009258594B1

(12) United States Patent
Mensch

(10) Patent No.: US 9,258,594 B1
(45) Date of Patent: Feb. 9, 2016

(54) WIRELESS ENTERTAINMENT CENTER

(71) Applicant: Linda S. Mensch, Chicago, IL (US)

(72) Inventor: Linda S. Mensch, Chicago, IL (US)

(73) Assignee: Linda S. Mensch, Chicago, IL (US)

( * ) Notice: Subject to any disclaimer, the term of this patent is extended or adjusted under 35 U.S.C. 154(b) by 0 days.

(21) Appl. No.: 14/314,949

(22) Filed: Jun. 25, 2014

Related U.S. Application Data

(63) Continuation of application No. 13/774,501, filed on Feb. 22, 2013, now abandoned, which is a continuation of application No. 13/038,558, filed on Mar. 2, 2011, now Pat. No. 8,407,745, which is a continuation of application No. 09/809,775, filed on Mar. 16, 2001, now Pat. No. 7,950,037.

(51) Int. Cl.
| | |
|---|---|
| *H04N 7/16* | (2011.01) |
| *H04N 21/414* | (2011.01) |
| *H04N 21/478* | (2011.01) |
| *H04N 21/61* | (2011.01) |
| *H04H 20/57* | (2008.01) |
| *H04N 21/2543* | (2011.01) |
| *H04N 21/475* | (2011.01) |

(52) U.S. Cl.
CPC ......... *H04N 21/41407* (2013.01); *H04H 20/57* (2013.01); *H04N 7/165* (2013.01); *H04N 21/2543* (2013.01); *H04N 21/4751* (2013.01); *H04N 21/4781* (2013.01); *H04N 21/6131* (2013.01)

(58) Field of Classification Search
CPC ....................................................... H04N 7/16
USPC .......... 725/5, 62, 89, 121, 123, 133, 141, 153
See application file for complete search history.

(56) References Cited

U.S. PATENT DOCUMENTS

| | | | |
|---|---|---|---|
| 5,247,347 A | 9/1993 | Litteral et al. | |
| 5,515,173 A | 5/1996 | Mankovitz et al. | |
| 5,541,638 A | 7/1996 | Story | |
| 5,552,837 A | 9/1996 | Mankovitz | |
| 5,553,123 A | 9/1996 | Chan et al. | |
| 5,592,537 A | 1/1997 | Moen | |
| 5,701,383 A | 12/1997 | Russo et al. | |
| 5,812,930 A | 9/1998 | Zavrel | |
| 5,812,931 A | 9/1998 | Yuen | |
| 5,815,195 A | 9/1998 | Tam | |
| 5,974,222 A | 10/1999 | Yuen et al. | |

(Continued)

OTHER PUBLICATIONS

Grover, R. et al., TV Guy: Will Gemstar-TV Guide's Henry Yeun take control of your TV Set?, Business Week, Mar. 21, 2011, pp. 66-70, 72, 746, 76 Mar. 12, 2001.

*Primary Examiner* — Hunter B Lonsberry
(74) *Attorney, Agent, or Firm* — Bryan Cave LLP

(57) ABSTRACT

An entertainment delivery system including a delivery station configured for receiving an order for entertainment content from a telephone, the telephone being configured to receive entertainment content over a wireless network, the telephone also having a display device adapted to display said entertainment content, a database coupled to the delivery station, wherein the delivery station is configured for retrieving the entertainment content from the database when the order is received, the entertainment content including video content for display, and a billing database coupled to the delivery station, wherein the delivery station is configured for sending a billing record corresponding to a user account associated with the telephone to the billing database when the order is received.

17 Claims, 4 Drawing Sheets

(56) References Cited

U.S. PATENT DOCUMENTS

| | | |
|---|---|---|
| 5,988,078 A | 11/1999 | Levine |
| 6,052,145 A | 4/2000 | Macrae et al. |
| 6,137,950 A | 10/2000 | Yuen |
| 6,157,377 A | 12/2000 | Shah-Nazaroff et al. |
| 6,470,378 B1 | 10/2002 | Tracton et al. |
| 6,792,280 B1 | 9/2004 | Hori et al. |
| 7,454,776 B1 | 11/2008 | Walker et al. |
| 7,634,794 B1 * | 12/2009 | Paik et al. .................. 725/62 |
| 7,950,037 B2 | 5/2011 | Mensch |
| 8,407,745 B2 | 3/2013 | Mensch |

* cited by examiner

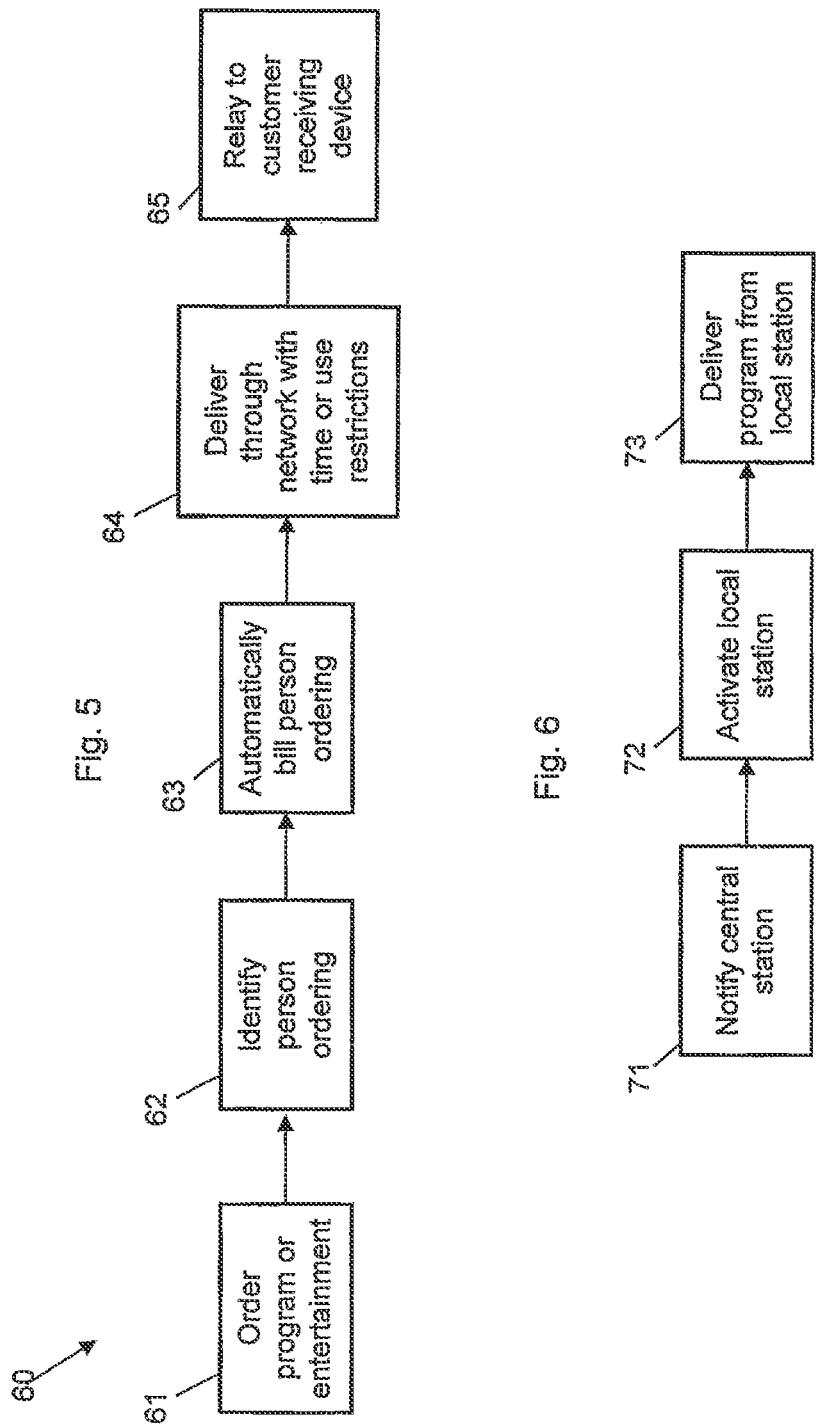

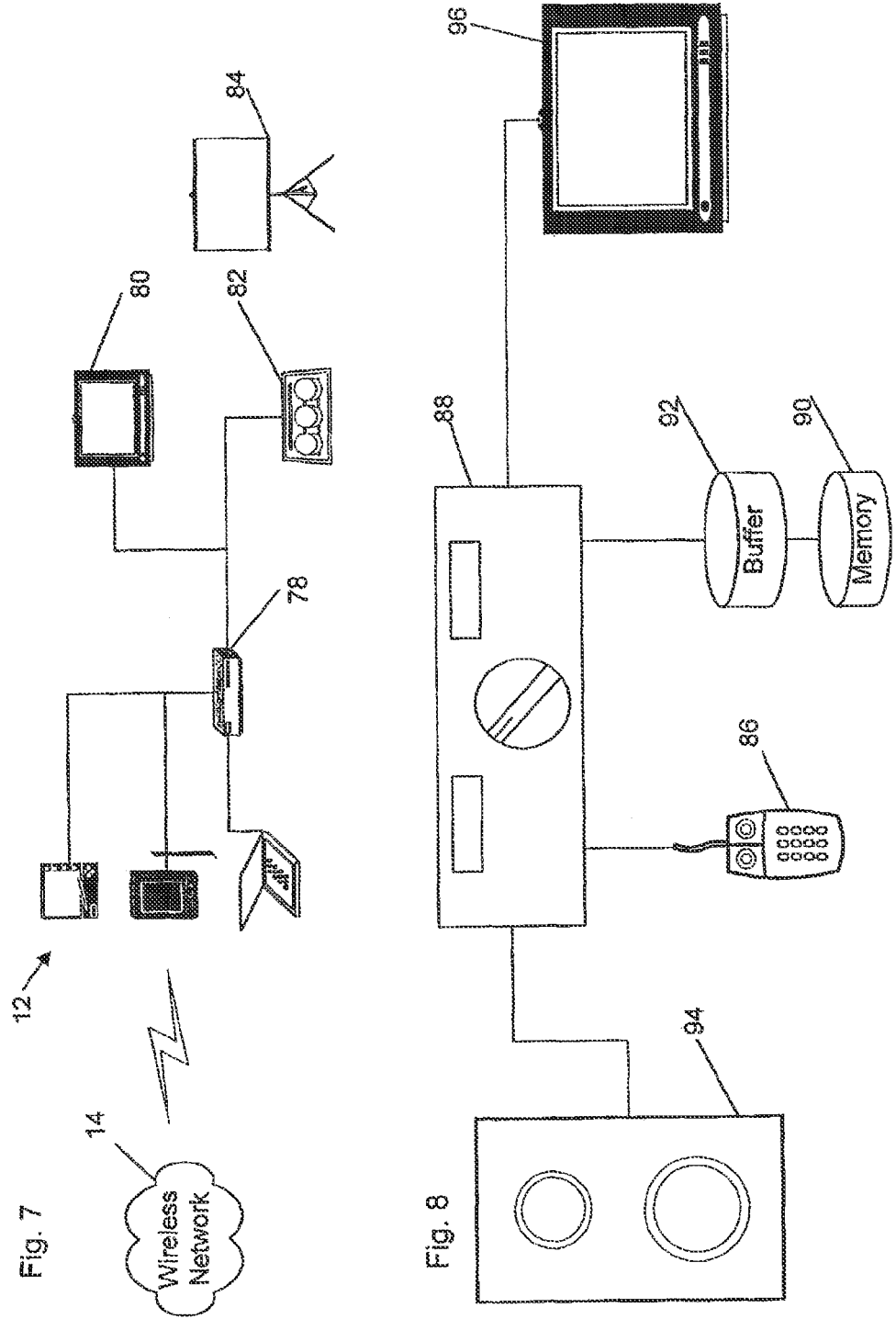

WIRELESS ENTERTAINMENT CENTER

CROSS REFERENCE AND RELATED APPLICATIONS

This application is a continuation of and claims priority to U.S. patent application Ser. No. 13/038,558 filed on Mar. 2, 2011, which is a continuation of and claims priority to U.S. patent application Ser. No. 09/809,775 filed on Mar. 16, 2001, now U.S. Pat. No. 7,950,037, issued May 24, 2011.

BACKGROUND OF THE INVENTION

Wireless telephones are becoming more and more popular world-wide, providing telecommunications options in the United States, in Europe, and in less-developed countries around the world. In countries that have developed a communications infrastructure, cell phones are popular because they are used more conveniently and more spontaneously than traditional telephones connected by hard-wire landlines. Even though long-distance communications have been relayed by means other than landlines for many years, cell phones may provide short, medium and long-distance communication facilities without regard to any existing infrastructure.

In countries lacking an extensive telecommunications infrastructure, cell phones may be the only option, outside the most heavily-populated cities. Thus, there has been a virtual explosion in the use of cell phones in developing nations. Cell phones provide much-needed communications facilities and make lives easier and more convenient by making communications not only possible, but also convenient. It is possible that developing countries, lacking infrastructure and having very large land masses, may never build expensive infrastructures covering those vast areas. Since cell phones can provide excellent, low-cost coverage, such countries may permanently forego installing a telecommunications infrastructure. Without such an infrastructure, telephone (copper) landlines and cable (fiber optic) landlines may not be available to serve customers. In these cases, there will be no infrastructure to bring in all the other private or commercial services, whether offered by private companies or through 30 governmental agencies in some countries, offered through landlines. These services include, but are not limited to, cable television. Internet service, play-per-pay video or music, and the like. What is needed is a way to bring news and entertainment to people not served by a hardwired telecommunications infrastructure. What is needed is a system to bring commercial news and entertainment to persons whose communications facilities may be limited to cell phones.

BRIEF SUMMARY OF THE INVENTION

One aspect of the invention is a system for delivering entertainment over a wireless network, where a delivery station provides entertainment or programming and a receiver receives such programming in response to an order from a person or a customer. The receiver may be a cellular telephone or a receiver built into a television viewing set or other device suitable for receiving and displaying the entertainment. The person ordering entertainment may enter and transmit the order via a cell phone to the company or agency providing the entertainment, such as an entertainment company that provides programming over a wireless network. The entertainment company then sends the entertainment or programming to the customer via the wireless network to a receiver suitable for displaying or for temporarily storing the entertainment or programming. Entertainment includes, but is not limited to, motion pictures, television shows, video games, educational, cultural or political events, sports programming, news, financial news, weather, and music.

Another aspect of the invention is a method for providing entertainment, in which a person desiring the entertainment orders the entertainment, and preferably as a part of the information sent to order the entertainment, identifies himself or herself. The method includes automatic billing for the entertainment to the person ordering the entertainment, and then delivering the entertainment through a wireless network. in order to contain costs and provide rapid, accurate billing to customers, the process should be as automated as possible, rarely requiring human intervention. The automated aspect of the invention is important for high-volume, low-cost, rapid processing of both billing and delivering.

BRIEF DESCRIPTION OF SEVERAL VIEWS OF THE DRAWINGS

FIG. 5 is a flow chart depicting a third method for marketing and delivering entertainment through a wireless delivery system.

FIG. 6 is a flow chart depicting a fourth method for marketing and delivering entertainment through a wireless delivery system.

FIG. 7 is a block diagram representing a way to access entertainment over a wireless network.

FIG. 8 is a block diagram representing another way to access entertainment over a wireless network.

Providing means the process by which an enterprise makes available an entertainment product or service to customers, delivers the product or service to those customers, and receives compensation in return. The enterprise may be a private, commercial company, or may be a governmental enterprise, or in some instances, may be a combination of the two. For example, a governmental information agency may contract for a privately owned or publicly-owned company to provide the service and collect the revenue from such entertainment. The invention is not limited to enterprises which are commercial, rather than governmental or mixed enterprises, but rather includes all enterprises providing entertainment and receiving compensation in the manner described herein.

DETAILED DESCRIPTION OF THE INVENTION

Figure 1:
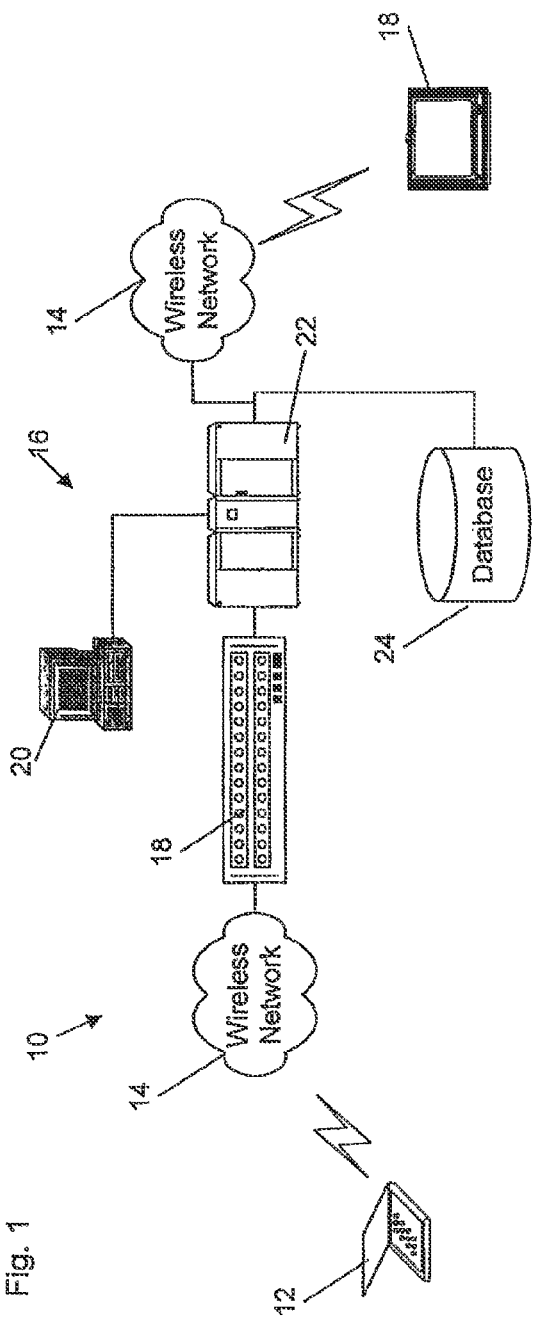
FIG. 1 is a pictorial representation of a system for delivering entertainment.

FIG. 1 is a representation of a system 10 for delivering entertainment through a wireless network, in which a customer orders entertainment through a wireless medium, such as a cellular telephone, and the enterprise delivers entertainment through a wireless medium, such as a wireless network. A customer orders entertainment through a wireless communication device 12, such as a cellular telephone. A wireless network 14 relays the order to a delivery station 16. The delivery station may include many functions that receive and process the order, bill the customer for the entertainment, and deliver the entertainment. Included in the station may be interface device 18, such as a modem, one or more computer workstations 20, a mainframe or other suitable computer 22 and a database 24 of entertainment.

Entertainment need not be maintained only at the delivery station, but may be available elsewhere for relaying or delivery to the station prior to, or simultaneous with, delivery to the customer. After the delivery station order receives and processes the order, the wireless network 14 relays the product to a cell phone 12 or to a receiver 18 in real time for immediate viewing or for storage at the receiver for time-delayed viewing.

Figure 2:
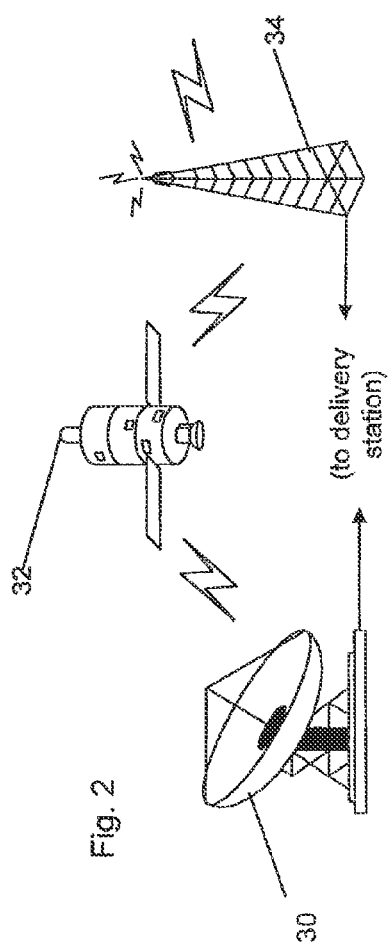
FIG. 2 is a representation of a delivery station for delivering entertainment.

FIG. 2 illustrates some of the possible components of the wireless network used to relay the entertainment signal to the customer receiver. Included are such items as a satellite dish 30 for sending and receiving signals to and from a satellite 32 held in orbit above the earth. In addition, a wireless network may include a transmission tower 34 for sending signals to customers and receiving signals from customers. Such towers may receive signals from one or more radio or microwave broadcast or transmission devices.

The wireless network relays information from a customer concerning the order, the identification of the customer and his or her account, and other information useful to either the customer or the providers of the entertainment.

In one embodiment, a customer turns on a cell phone and dials an Internet web site. The customer may have a unique logon identification that identifies him or her to the web site. The customer then selects entertainment or programming for immediate or later viewing, and orders the entertainment or program. The wireless network relays the order, and other pertinent identifying information, to the delivery station. The delivery station processes the order and may separate the ordering information into portions that deal separately with the entertainment order and with billing for the order.

In a preferred embodiment, the billing for the entertainment is forwarded to a cell phone account for the customer, and is added to the customers cell phone bill. The delivery station processes the order and readies the entertainment programming for relaying or transmission to the customer. The programming is relayed, again through a wireless network, to a receiver accessible by the customer, for viewing or listening to the program.

In one embodiment, a viewer receives the entertainment in a fashion that will not be amenable to permanent storage, but rather for one-time viewing, that is, the delivery station delivers the entertainment or programming by streaming in real time to the customer rather than downloading a copy of the entertainment data. In another embodiment, the programming is downloaded in its entirety, but with a limit on the number of times and/or the period over which the entertainment or programming may be viewed. The information included in the customer's order may include a time for viewing, so that the streaming or downloading may be timed to the convenience of the customer. In another embodiment, the entertainment may be sent for temporary storage and later viewing, allowing time for the information exchange.

The memory for storing the entertainment data may reside in the customer's cell phone or any other device suitable for storing the data, and perhaps also suitable for appropriate connection to a viewing device. For example, a memory device may be installed in the customer's cell phone or in a memory unit, for example a hard drive, connected to a receiving device, such as a television. The delivery station then delivers the programming selection to the cell phone or the remote memory device, and the cell phone or other remote memory device then connects to an audio, video, or both audio and video display device. The entertainment or programming may be downloaded rather than streamed with a specific time for initiating the data transfer or for defining a period after which the utility of the programming ends, such as a specific time several hours in the future (for instance, 1100 p.m. local time) or after a time lapse (for instance, four hours after downloading the data).

Figure 3:
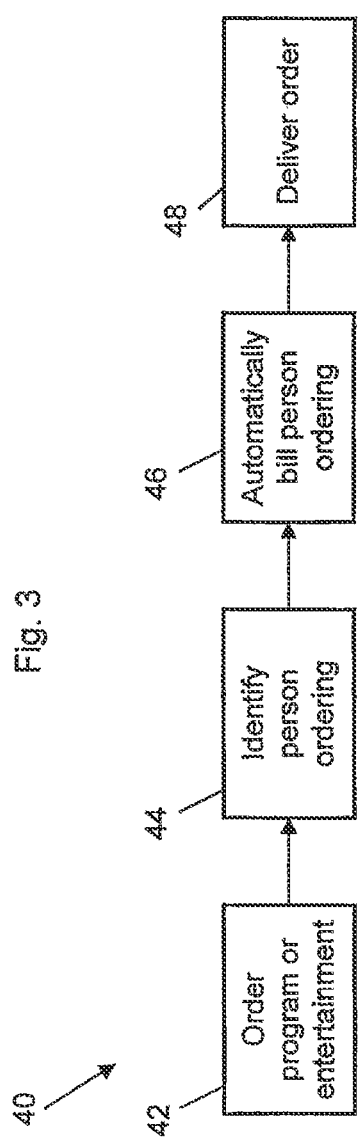
FIG. 3 is a flow chart depicting a method for marketing and delivering entertainment through a wireless delivery system.

FIG. 3 is a flowchart for one method 40 of practicing the invention. A customer orders programming or entertainment 42 over a wireless network, preferably by making a telephone call through a cell phone. The telephone call includes all necessary information for the delivery station to identify the person ordering the entertainment 44. The information also includes identification sufficient to automatically bill 46 the person ordering the information. For example, a particular cell phone and its telemetry may identify the caller with sufficient particularity so that the caller may be billed for the telephone call. The delivery station may also use that same information to identify the caller and thus identify who is ordering the entertainment and who is responsible for the bill.

In other embodiments, the caller identification may be a default for billing for the entertainment order, subject to change by the caller if the entertainment is to be billed to another. This provision may not be preferred, since it adds complexity and the possibility of error or fraud when the caller makes additional entries to identify another party as the party responsible for the bill. Lastly, the delivery station delivers the entertainment to a selected customer and/or device 48. The caller identification may have an associated default entry for the delivery of the entertainment, that is, the person or device to receive the entertainment. A caller may also have the option of specifying receiver other than the caller who is billed for the entertainment. Again, this option of a different receiver for the entertainment adds complexity and the possibility of error when making additional entries, and may not be the most preferred method.

The information needed for ordering, identifying, billing and delivering the entertainment may be obtained from a cell phone-identifying signal that is sent when the cell phone begins a telephone call. Alternatively, the caller may enter a unique code or password that identifies this information. Other methods of identifying the billing and receiving parties may also be used, so long as the delivery station can obtain this information with sufficient particularity to deliver and bill for entertainment. A person to whom the entertainment is to be delivered may thus be a person designated for receiving the entertainment. This person may be the same or may be a different person from the person designated for receiving the bill. There must also be a way for the caller to identify the product or service desired. This may be a code punched into the cell phone when the caller first makes the call to the delivery station, or may be a menu-driven system, in which the caller identifies the desired entertainment by a series of responses or entries.

Wireless communications devices other than cellular telephones may also practice the method. Personal digital assistants, or other wireless communication devices with audio and/or video components may be used to communicate entertainment desires to a delivery station or service. For these devices, information exchange may occur via one or more menu-driven screens, in which the menus appear with a visual content rather than an audio context, or may also be both video and audio. In any case, the same exchange of information is necessary to complete the transaction, that is, identifying the customer, ordering the entertainment, billing the customer, perhaps via a cell phone number or an account number, and delivering the entertainment to the customer.

In one embodiment, a caller may use a wireless personal digital assistant to access the Internet or the Worldwide Web.

The caller may then enter a website URL for the entertainment or delivery company, and order entertainment via a series of entries in response to web-enabled queries, the entries relayed over a wireless network to the entertainment or delivery company. The delivery company can easily identify the customer via the information entries, or by the use of stored information such as "cookies," and can identify the programming desired as well. Delivery then occurs as described above.

Figure 4:
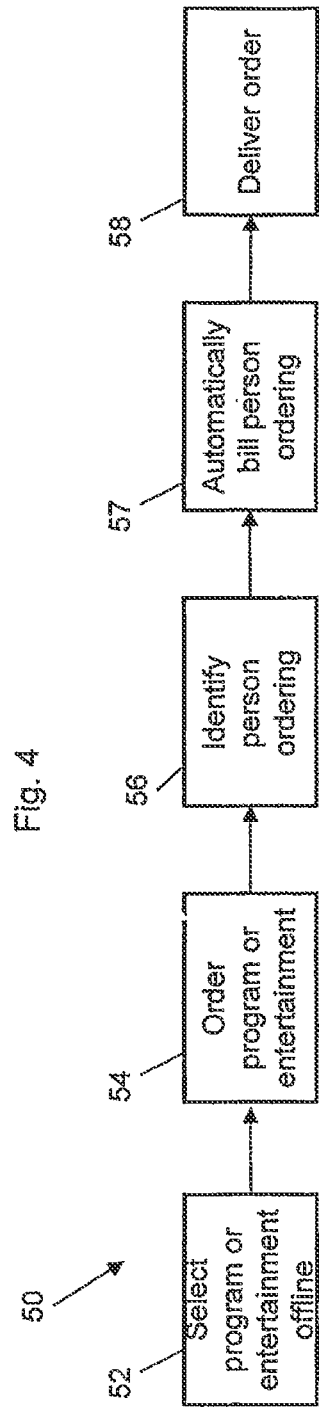
FIG. 4 is a flow chart depicting a second method for marketing and delivering entertainment through a wireless delivery system.

FIG. 4 depicts another method 50. A user or customer may select a desired program or entertainment offline 52, before accessing a delivery company. At some point thereafter, the customer accesses the delivery company and the desired program or entertainment is ordered 54 automatically. The customer identifying information 56, as described above, may be gathered automatically, as from signals from the operation of a wireless communication device, or may be discrete or preprogrammed entries from the wireless communication device. In order to quickly and efficiently process the order, the information should enable the delivery station to automatically bill for the service 57, and then deliver the order 58 to a preselected receiver.

As mentioned above, there are alternate ways to practice the invention, in which the person ordering is not the person responsible for the bill, and the person ordering may not be the person to whom the delivery station sends the programming. In the preferred embodiment, however, the person ordering is responsible for the bill and receives the order.

FIG. 5 depicts yet another way 60 to practice the method. In this method, a person orders a program or entertainment 61, identifies himself or herself 62, and the delivery station or company automatically bills the person 63. In this method, the entertainment is delivered through a wireless network 64, but may not be delivered directly to the customer, but rather through some intermediary. This intermediary may be a memory device, such as a memory on a wireless communications medium or device. In this method, the delivery station may deliver the service or product with restrictions, for instance, the entertainment or programming may be viewed only once or a limited number of times. In one way of practicing the invention, a program is sent to a memory device on the cell phone and the cell phone is then connected to a viewer, such as a television set in the customer's home, for viewing. In another way of practicing the invention, a memory device on the viewer's television set receives the programming for later viewing.

FIG. 6 depicts yet another way 71 of practicing the invention, wherein a central station receives the programming ordered by the customer, activates a local station to send the programming 72 to the customer when the customer desires the programming. For example, the program could be downloaded from the central station to the local station, which would then download or stream it to the customer 73 at the appropriate time.

This invention uses wireless communications devices, including cell phones, which in some countries use frequencies from about 900 MHz to about 1900 MHz. Other countries may use other frequencies, both lower, such as frequencies normally used for television, 50-800 MHz, or higher, having frequencies above 2 GHz. The requirement is simply that the signal and bandwidth used are sufficient to contain the information required to convey the programming or entertainment. Thus, digital conversion of the signal may be accomplished and sent to the customer via a convenient frequency, rather than analog signals. The entertainment enterprise or delivery station may also use other techniques well known in communications arts, including encryption and decryption, video and audio signal compression, and code-division multiple access (COMA).

FIGS. 7 and 8 depict specific ways of accessing entertainment over a wireless network. In FIG. 7, a user has ordered entertainment and the entertainment is being delivered over a wireless network 14 to a wireless communication device 12, such as a cell phone, a personal digital assistant, or a pen-driven hand-held communications computer. The wireless device interfaces with a receiver 78 or other device capable of receiving and recording associated communication signals. The receiver is capable of utilizing the signals for viewing on a television 80 or a projector 82 used with a screen 84, either the television or the projector being used to view the entertainment or programming ordered.

In another embodiment depicted in FIG. 8, a special purpose cell phone 86 has received the program signals from the wireless network (not shown) and is transmitting received signals to an entertainment center 88 in a streaming format and/or to a memory device 90 for recording and later one-time-only playback. The memory device may work with a buffer memory 92 and the entertainment center to utilize the signals for routing to one or more speakers 94 if the entertainment ordered includes an audio portion, such as a motion picture or a musical selection. The entertainment may have a video portion, such as a television program or a computer-type game, which may be viewed on a television or CRT screen 96. Not shown are other well-known devices useful in utilizing such programming or entertainment, such as a mouse or joy-stick useful in playing video games.

It will be recognized that there are many ways to practice the invention. For instance, the sequence of operations used in ordering entertainment could have more steps. Examples would be credit verification or an accounts receivable check on the person or account ordering entertainment, before the step of delivering entertainment.

The invention may be practiced by more than one company; for instance, a cell phone company may contract with an entertainment company or any other media company to provide entertainment. A cell phone company may also contract with more than one content provider to provide entertainment to customers. The prime contractor need not be a cell phone company, but could be an entertainment company working with communications media to provide entertainment.

Accordingly, it is the intention of the applicant to protect all variations and modifications within the valid scope of the present invention. It is intended that the invention be defined by the following claims, including all equivalents.

What is claimed is:

1. A method for delivering entertainment content, the method comprising:
   receiving an order for entertainment content from a wireless communication device over a wireless network, wherein the received order includes an identifier associated with the wireless device and wherein the identifier is a cellular phone identifying signal;
   processing the order using the identifier;
   retrieving the entertainment content from a database; and
   delivering the entertainment content to the wireless communication device over the wireless network.

2. The method of claim 1, wherein the wireless network comprises the internet.

3. The method of claim 1, wherein the wireless communication device is a mobile telephone.

4. The method of claim 1, wherein the identifier is sufficient to identify an account for receiving a bill; and wherein said processing comprises generating a billing record corresponding to the identified account.

5. The method of claim 4, wherein said processing further comprises sending the generated billing record to a party associated with the identified account.

6. The method of claim 4, wherein the account comprises a default account.

7. The method of claim 1, wherein the information comprises a cookie retrieved from the wireless communication device.

8. An apparatus for delivering entertainment content, the apparatus comprising:
an interface device that receives an order for entertainment content from a wireless communication device over a wireless network, wherein the received order includes an identifier associated with the wireless device and wherein the identifier is a cellular phone identifying signal;
a computer configured to:
process the order using the identifier;
retrieve the entertainment content from a database; and
deliver the entertainment content to the wireless communication device over the wireless network.

9. The apparatus of claim 8, wherein the apparatus comprises a delivery station.

10. The apparatus of claim 8, further comprising:
a database for storing the entertainment content;
wherein said computer is further configured to retrieve the entertainment content from said database.

11. The apparatus of claim 8, wherein said computer is further configured to:
generate a billing record corresponding to an account associated with the identifier; and send the generated billing record to a location associated with the identifier.

12. A method for providing entertainment content for a wireless communication device, the method comprising:
sending a request for entertainment content from the wireless communication device over a wireless network, wherein the request includes an identifier associated with the wireless device, wherein the identifier is a cellular phone identifying signal and wherein the identifier is sufficient to allow a user associated with the wireless device to be billed for the entertainment content;
receiving the entertainment content over the wireless network by the wireless communication device; and
storing the received entertainment content in a memory of the wireless communication device.

13. The method of claim 12 further comprising:
playing the stored entertainment content on a display of the wireless communication device.

14. The method of claim 12, further comprising:
playing the stored entertainment content on a device connected to the wireless communication device.

15. An apparatus for providing entertainment content, the apparatus comprising:
a wireless communication device configured to send a request for entertainment content from the wireless communication device over a wireless network, wherein the request includes an identifier associated with the wireless device, wherein the identifier is a cellular phone identifying signal and wherein the identifier is sufficient to allow a user associated with the wireless device to be billed for the entertainment content;
a receiver in the wireless communication device configured to receive the entertainment content over the wireless network;
a memory in the wireless communication device configured to at least temporarily store the received entertainment content.

16. The apparatus of claim 15, further comprising:
a display for displaying the stored entertainment content.

17. The apparatus of claim 15, further comprising:
a controller configured to play a video game using the received entertainment content.

* * * * *